(12) United States Patent
Li

(10) Patent No.: US 11,034,804 B2
(45) Date of Patent: Jun. 15, 2021

(54) METHOD FOR PREPARING MASTERBATCH AND FIBER WITH COMPOSITE ANTIBACTERIAL AND DEODORIZING FUNCTIONS

(71) Applicant: ZHEJIANG YINYU NEW MATERIAL CO., LTD, Jinhua (CN)

(72) Inventor: Gang Li, Jinhua (CN)

(73) Assignee: ZHEJIANG YINYU NEW MATERIAL CO., LTD, Jinhua (CN)

( * ) Notice: Subject to any disclaimer, the term of this patent is extended or adjusted under 35 U.S.C. 154(b) by 84 days.

(21) Appl. No.: 16/612,404

(22) PCT Filed: Jun. 9, 2017

(86) PCT No.: PCT/CN2017/087659
§ 371 (c)(1),
(2) Date: Nov. 11, 2019

(87) PCT Pub. No.: WO2018/205330
PCT Pub. Date: Nov. 15, 2018

(65) Prior Publication Data
US 2020/0115511 A1 Apr. 16, 2020

(30) Foreign Application Priority Data

May 11, 2017 (CN) .......................... 201710331216.X

(51) Int. Cl.
| | |
|---|---|
| *C08J 3/22* | (2006.01) |
| *C08K 3/08* | (2006.01) |
| *C08K 3/22* | (2006.01) |
| *C08K 5/17* | (2006.01) |
| *C08K 5/42* | (2006.01) |
| *C08K 5/43* | (2006.01) |
| *C08K 9/06* | (2006.01) |
| *C08L 23/06* | (2006.01) |
| *C08L 23/12* | (2006.01) |
| *C08L 67/02* | (2006.01) |
| *C08L 77/06* | (2006.01) |
| *D01F 1/10* | (2006.01) |

(52) U.S. Cl.
CPC ................. *C08J 3/226* (2013.01); *C08K 3/08* (2013.01); *C08K 3/22* (2013.01); *C08K 5/17* (2013.01); *C08K 5/42* (2013.01); *C08K 5/43* (2013.01); *C08K 9/06* (2013.01); *C08L 23/06* (2013.01); *C08L 23/12* (2013.01); *C08L 67/02* (2013.01); *C08L 77/06* (2013.01); *C08K 2003/085* (2013.01); *C08K 2003/2248* (2013.01); *C08K 2201/001* (2013.01); *C08K 2201/003* (2013.01); *C08L 2201/00* (2013.01); *C08L 2203/02* (2013.01); *D01F 1/10* (2013.01)

(58) Field of Classification Search
CPC ... C08J 3/226; C08K 3/08; C08K 3/22; C08K 5/17; C08K 5/42; C08K 5/43; C08K 9/06; C08L 23/06; C08L 23/12; C08L 67/02; C08L 77/06
See application file for complete search history.

(56) References Cited

PUBLICATIONS

CN 105671682 machine translation (Year: 2016).*
CN 103741242 machine translation (Year: 1998).*

\* cited by examiner

*Primary Examiner* — Edward J Cain
(74) *Attorney, Agent, or Firm* — Idea Intellectual Limited; Margaret A. Burke; Sam T. Yip

(57) ABSTRACT

The present invention provides a method for preparing a masterbatch and fibers with composite antibacterial and deodorizing functions including surface modifying a copper powder; functionalizing resin powder; and preparing the composite antibacterial and deodorizing masterbatch. The present invention provides a new antibacterial compounding mechanism to prepare new antibacterial and deodorizing masterbatch and fibers which have permanent antibacterial function, and the mechanical properties thereof can reach the standard of general fibers; fully meets the requirements of various weaving; the cost thereof is comparable to that on antibacterial post-treatment; and the pollution is reduced. The present invention can increase the export volume and additional value of the textiles.

9 Claims, 1 Drawing Sheet

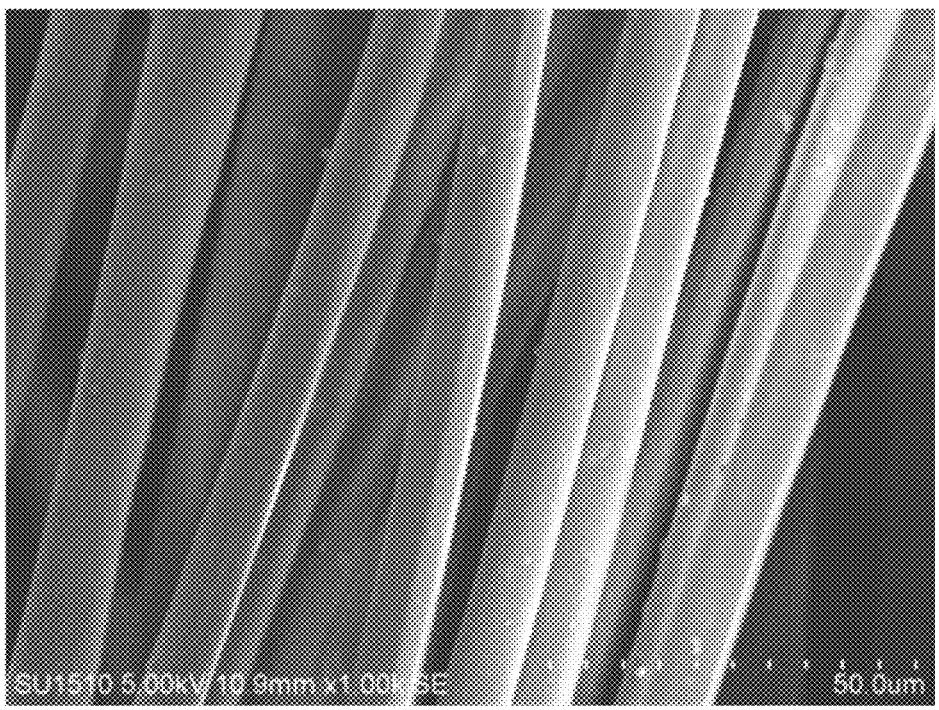

METHOD FOR PREPARING MASTERBATCH AND FIBER WITH COMPOSITE ANTIBACTERIAL AND DEODORIZING FUNCTIONS

CROSS-REFERENCE TO RELATED APPLICATION

This application is a 371 application of the International Patent Application No. PCT/CN2017/087659 filed on Jun. 9, 2017, which claims priority from the Chinese invention patent application no. 201710331216.X filed on May 11, 2017, and the disclosures of which are incorporated herein by reference in their entirety.

FIELD OF THE INVENTION

The present invention relates to the technical field of functional textile materials. More particularly, it relates to a method for preparing a masterbatch and fibers with composite antibacterial and deodorizing functions.

BACKGROUND

The demand for antibacterial functionalization of fabrics is gradually increasing with the improvement of living standards. At present, there are some solutions, for example, antibacterial fibers which can be prepared by the fiber source. For example, silver antibacterial systems used in the past can achieve good antibacterial effect. However, the silver ion migration is also a potential threat that would affect normal cells. Therefore, copper ion antibacterial systems are currently promoted and being widely used in some fields of medical and domestic textiles.

However, such fibers also have irreparable defects:

First, the cost is too high: The purity of copper would affect the antibacterial properties of the fibers, the cost for preparing and processing of the metal powders are also relatively high. Therefore, the cost of using the copper powder to achieve the antibacterial effect is unacceptable for traditional textiles;

Second, the mechanical properties of the fibers are poor: The copper powder is a kind of active metal material, especially after being turned into small particles, that could have certain catalytic performance to make fiber mechanical properties even worse.

Third, security risks: The processing of copper powders easily causes explosion, etc., hence the addition of copper powder is minimized on the basis of ensuring antibacterial properties.

Fourth, the antibacterial effectiveness: Although the addition of copper powder results in certain antibacterial performance, removal of unpleasant odor from some daily household items such as socks and underwear is also needed, which is difficult to achieve by using conventional copper ion fibers, and thus functionally compounding is required.

In general, more fabrics on the market have gone through antibacterial post-treatment to gain antibacterial function because this method is less costly and more effective than the use of antibacterial fibers, and is therefore used by most fabric manufacturers. Although this method is inexpensive and effective, it also has inevitable defects:

(1) Additional pollution: the antibacterial agent is generally used for antibacterial post-treatment, which increases the degree of pollution from the wastewater and the difficulty in wastewater treatment;

(2) Low sustainability: the products with the conventional antibacterial post-treatment has poor washing durability. In general, they hardly reach the standard of washing durability, which does not favor export of the textiles, resulting in lower competitiveness of the textiles and increasing disputes in trade.

SUMMARY OF THE INVENTION

This section aims to summarize some aspects of the embodiments of the present invention and to briefly describe some preferred embodiments. The simplification or omission may be made in this section, the abstract of the specification, and the title to avoid obscuring the purpose of this section, the abstract of the specification, and the title. Such simplification or omission may not be used to limit the scope of the present invention.

The present invention has been made in view of the technical drawbacks of the above-mentioned and/or existing masterbatch and fibers with composite antibacterial and deodorizing functions.

Therefore, one of the objectives of the present invention is to provide a method for preparing the masterbatch and fibers with composite antibacterial and deodorizing functions in order to overcome the technical hurdles in the conventional technologies. The present functional masterbatch is prepared from a copper powder preparation and a surface-modified as well as functionally compounded resin powder.

To solve the technical problems as above-mentioned, the present invention provides the following solutions: a method for preparing the composite masterbatch with antibacterial and deodorizing function comprising:

surface modifying copper powder: mixing a surface modifier with said copper powder at a temperature from 20-90° C. and a stirring speed from 500-2000 r/min to form a conductive nanopowder, wherein the surface modifier is 1-5 wt % of the weight of the copper powder, and said mixing time is 30-90 min;

functionalization of resin powder: mixing organic benzenesulfonates or organic sulfates and hydrazides or polyamines to form a first mixture, and then further mixing with a resin powder at certain molar ratio to form a functional composite resin powder, wherein the molar ratio of organic benzenesulfonates or organic sulfates to hydrazides or polyamines is from 1:9 to 9:1, and the molar ratio of the first mixture to the resin powder is from 1:5 to 1:100;

preparing the composite masterbatch with antibacterial and deodorizing functions: the conductive nanopowder and the functional composite resin powder are mixed evenly, where the weight of copper powder is 10-50 wt % of the total weight of the mixture, and the mixture is blended and granulated to obtain the antibacterial and deodorizing masterbatch composite.

In an embodiment of the present invention, prior to surface modification of the copper powder, the present method further comprises preparing copper powder with a particle size of less than 2 μm.

In an embodiment of the present invention, the copper powder is prepared by mechanical mill or jet mill.

In an embodiment of the present invention, the copper powder is one or more of copper powder, copper oxide powder, cuprous oxide powder, tetraamminecopper (II) sulfate, copper acetate, copper oxalate and/or copper citrate.

In an embodiment of the present invention, the surface modifier is a series of active organosilicon surface modifier including vinyl trimethoxysilane or 3-aminopropyltrimethoxysilane.

In an embodiment of the present invention, the resin powder is one or more of PET powder, PBT powder, PTT powder, PC powder, nylon 6 powder, nylon 66 powder, polypropylene powder and/or polyethylene powder.

In an embodiment of the present invention, each of the organic benzenesulfonates and organic sulfates may comprise one or more species, and each of the hydrazide and polyamine may comprise one or more species, wherein the organic benzenesulfonates comprise sodium dodecylbenzene sulfonate; the organic sulfates comprises sodium dodecyl sulfate; the hydrazide comprises 1-pyrazolyl-2-arylhydrazide compound; and the polyamine comprises ethylenediamine and triethanolamine.

In an embodiment of the present invention, the resin is basic resin being one or more of polyester, polyolefin and/or polyamide.

Another objective of the present invention is to provide a method for preparing a composite antibacterial and deodorizing fiber. A composite antibacterial and deodorizing fiber having different colors is thereby prepared through spinning the composite antibacterial and deodorizing masterbatch of the present invention.

In order to solve the afore-mentioned technical problems, the present invention provides the following solutions: a method for preparing a composite antibacterial and deodorizing fiber, the method comprising:

preparing a composite antibacterial and deodorizing masterbatch;

drying said masterbatch at 100-180° C. for 2-12 hrs;

mixing the dried masterbatch with basic resin thoroughly to form a mixture;

melt spinning the mixture at a spinning speed of 600 to 3,000 m/min with an initial pressure of the spinning component being set at 8 to 16 MPa to obtain a composite antibacterial and deodorizing fiber.

In an embodiment of the present invention, the composite antibacterial and deodorizing fiber has a single fiber diameter of 0.5 to 10 D.

The advantages of the present invention are: the present invention provides a new antibacterial compounding mechanism to prepare new antibacterial deodorizing fibers, which has permanent antibacterial function. The mechanical properties can reach the standard of general fibers, and fully meet the requirements of various weaving. The cost is comparable to that on antibacterial post-treatment, and the pollution is reduced. The present invention can increase the export volume and additional value of textiles.

BRIEF DESCRIPTION OF THE DRAWINGS

In order to more clearly illustrate the technical solution from the embodiments of the present invention, the drawings used in the description of the embodiments will be briefly described below. The drawings provided hereinafter are only some embodiments of the present invention, and other drawings may also be derived therefrom by persons having ordinary skill in the art in view of the drawings, in which:

FIG. 1 is a SEM image of the antibacterial deodorizing fibers prepared according to an embodiment of the present invention.

DETAILED DESCRIPTION

The above described objectives, features and advantages of the present invention will become more apparent from the detailed description.

In the following description, numerous specific details are set forth in order to provide a full understanding of the present invention. However, the present invention may be practiced in other ways than those described herein, and the persons having skill in the art can make similar promotion without departing from the scope of the invention, and thus the invention is not limited by the specific embodiments disclosed below.

In addition, the term "one embodiment" or "an embodiment" as used herein refers to a particular feature, structure, or characteristic that can be included in at least one implementation of the invention. The appearances of the "in one embodiment" in the specification are not intended to refer to the same embodiment or the embodiments that are exclusive or exclusive of the other embodiments.

Example 1

A cuprous oxide powder having a particle diameter less than 2 μm is prepared by mechanical milling.

Surface modification of the cuprous oxide powder: The surface of the cuprous oxide powder is modified by a high-speed kneader at a temperature of 20° C. and a stirring speed of 500 r/min. The surface modifier is added through a measuring device to mix with the cuprous oxide powder in an amount of 1 wt % of the weight of the cuprous oxide powder at high speed for 90 mins. The surface modifier is a series of active organosilicon surface modifier such as vinyl trimethoxysilane.

Functionalization of resin powder: sodium dodecyl benzene sulfonate and polyethylene polyamine in a molar ratio of 9:1 are pre-mixed to form a first mixture and then mixed with resin powder by a premixing machine to form a functional composite resin powder. The ratio of the first mixture to the resin powder is 1:20.

Preparation of the composite antibacterial and deodorizing masterbatch: The surface-modified cuprous oxide powder and the functional composite resin powder are mixed evenly to form a mixture, where the resin powder is PBT resin powder, and the cuprous oxide powder is in an amount of 10 wt % of the total weight of the mixture, and the mixture is compounded by twin-screw extruder under a temperature of 250° C. to obtain the composite antibacterial and deodorizing masterbatch.

Example 2

A cuprous oxide powder having a particle diameter less than 2 μm is prepared by mechanical milling.

Surface modification of the cuprous oxide powder: The surface of the cuprous oxide powder is modified by a high-speed kneader at a temperature of 20° C. and a stirring speed of 500 r/min. The surface modifier is added through a measuring device to mix with the cuprous oxide powder in an amount of 1 wt % of the weight of the cuprous oxide powder at high speed for 90 mins. The surface modifier is a series of active organosilicon surface modifier such as vinyl trimethoxysilane.

Functionalization of resin powder: sodium dodecyl benzene sulfonate and polyethylene polyamine in a molar ratio of 9:1 are pre-mixed to form a first mixture and then mixed with resin powder by a premixing machine to form a functional composite resin powder. The ratio of the first mixture to the resin powder is 1:20.

Preparation of the composite antibacterial and deodorizing masterbatch: The surface-modified cuprous oxide powder and the functional compound resin powder are mixed evenly to form a mixture, where the resin powder is PBT resin powder, and the cuprous oxide powder is in an amount of 10 wt % of the total weight of the mixture, and the mixture is compounded by twin-screw extruder under a temperature of 250° C. to obtain the composite antibacterial and deodorizing masterbatch.

The antibacterial deodorizing masterbatch is dried at a temperature of 100° C. for 8 hours. The dried antibacterial deodorizing masterbatch and the basic resin are mixed evenly to form a mixture, and then the mixture is fed into a feeder of the spinning machine for melt spinning, where the basic resin is PET; the spinning temperature is 285° C.; the spinning speed is 600 m/min; and the initial pressure of the spinning component is 8 Mpa to obtain the antibacterial and deodorizing fiber. The antibacterial and deodorizing fiber can be in different colors such as yellow, black, etc.

The mechanical properties of the antibacterial deodorizing fiber obtained in Example 2 are tested and the results are as follows: the tensile strength is 2.43 cn/dtex, the elongation at break is 18%, which satisfies the requirements of various weaving methods. The diameter of the single fiber is 1 D (7 μm), and the fiber can be developed into various fabrics such as woven fabric and velvet fabric. When the content of antibacterial and deodorizing fiber in the woven fabric exceeds 25%, the antibacterial property meets the national standard requirements. The antibacterial activity is 95% to *Escherichia coli*, 94% to *Staphylococcus aureus*, and 93% to *Candida albicans*. The deodorization test result is shown in the following table 1:

TABLE 1

| Test items | Test Standards | Test Results | unit |
|---|---|---|---|
| Ammonia | Refer to part 21 of SEK standard | 92 | % |
| Acetic acid | provided by Japan textile | 94 | |
| Isovaleric acid | evaluation technology council | 93 | |

FIG. 1 is a scanning electron micrograph of an antibacterial deodorizing fiber. From FIG. 1, it is observed that the particles with a particle diameter of less than 2 μm form a uniform distribution on the surface of the fiber. The small protrusions from the particles have good antibacterial effect and can enter the bacterial cell nucleus after contacting with bacteria, thereby killing them. Sodium dodecyl benzene sulfonate and polyethene polyamine are alkaline substances, their presence not only kills the bacteria but also oxidizes cuprous powder to exert synergic effect of antibacterial function, they also neutralize the unpleasant odors emitted by bacteria, keeping the fabric and the wearer comfortable.

Example 3

A cuprous oxide powder having a particle diameter less than 2 μm is prepared by mechanical milling.

Surface modification of the cuprous oxide powder: The surface of cuprous oxide powder is modified by a high-speed kneader at a temperature of 20° C. and a stirring speed of 500 r/min. The surface modifier is added through a measuring device to mix with the cuprous oxide powder in an amount of 5 wt % of the weight of the cuprous oxide powder at high speed for 90 min. The surface modifier is a series of active organosilicon surface modifier such as 3-aminopropyltrimethoxysilane.

Functionalization of resin powder: sodium dodecyl benzene sulfonate and polyethylene polyamine in a molar ratio of 1:9 are pre-mixed to form a first mixture and then mixed with PBT resin powder by a premixing machine to form a functional composite resin powder. The ratio of the first mixture to the resin powder is 1:20.

Preparation of the composite antibacterial and deodorizing masterbatch: The surface-modified cuprous oxide powder and the functional composite resin powder are mixed evenly to form a mixture, where the resin powder is PBT resin powder; the cuprous oxide powder is in an amount of 40 wt % of the total weight of the mixture, and the mixture is compounded by twin-screw extruder under a temperature of 250° C. to obtain the composite antibacterial and deodorizing masterbatch.

Example 4

A cuprous oxide powder having a particle diameter less than 2 μm is prepared by mechanical milling.

Surface modification of the cuprous oxide powder: The surface of cuprous oxide powder is modified by a high-speed kneader at a temperature of 20° C. and a stirring speed of 500 r/min. The surface modifier is added through a measuring device to mix with the cuprous oxide powder in an amount of 5 wt % of the weight of the cuprous oxide powder at high speed for 90 mins. The surface modifier is a series of active organosilicon surface modifier such as 3-aminopropyltrimethoxysilane.

Functionalization of resin powder: sodium dodecyl benzene sulfonate and polyethylene polyamine in a molar ratio of 1:9 are pre-mixed to form a first mixture and then mixed with PBT resin powder by a premixing machine to form a functional composite resin powder. The ratio of the first mixture to the resin powder is 1:20.

Preparation of composite antibacterial and deodorizing masterbatch: The surface-modified cuprous oxide powder and the functional composite resin powder are mixed evenly to form a mixture, where the resin powder is PBT resin powder; the cuprous oxide powder is in an amount of 40 wt % of the total weight of the mixture, and the mixture is compounded by twin-screw extruder under a temperature of 250° C. to obtain the composite antibacterial and deodorizing masterbatch.

The antibacterial deodorizing masterbatch is dried at a temperature of 100° C. for 8 hours, and the dried antibacterial deodorizing masterbatch and the basic resin are mixed evenly to form a mixture, and then the mixture is fed into a feeder of the spinning machine for melt spinning, where the basic resin is PET; the spinning temperature is 285° C.; the spinning speed is 600 m/min; and the initial pressure of the spinning component is 8 Mpa in order to obtain the antibacterial and deodorizing fiber. The antibacterial and deodorizing fiber can be in different colors such as yellow, black, etc.

The mechanical properties of the antibacterial deodorizing fiber obtained in Example 4 are tested and the results are as follows: the tensile strength is 2.21 cn/dtex, the elongation at break is 19%, which satisfies the requirements of various weaving methods. The diameter of the single fiber is 1 D (7 μm), and the fiber can be developed into various fabrics such as woven fabric and velvet fabric. When the content of antibacterial and deodorizing fiber in the woven fabric exceeds 25%, the antibacterial property thereof meets the national standard requirements. The antibacterial activity is 98% to *Escherichia coli*, 99% to *Staphylococcus aureus*, and 99% to *Candida albicans*. The deodorization test result is shown in the following table 2:

TABLE 2

| Test items | Test Standards | Test Results | unit |
|---|---|---|---|
| Ammonia | Refer to part 21 of SEK standard | 97 | % |
| Acetic acid | provided by Japan textile | 98 | |
| Isovaleric acid | evaluation technology council | 96 | |

Example 5

A tetraamminecopper (II) sulfate powder with particle diameter less than 2 μm is prepared by mechanical milling.

Surface modification of the tetraamminecopper (II) sulfate powder; The tetraamminecopper (II) sulfate powder is surface-modified by a high-speed kneader at a temperature of 20° C. and a stirring speed of 500 r/min. The surface modifier is added through a measuring device to mix with tetraamminecopper (II) sulfate powder. The surface modifier is in an amount of 3 wt % of the weight of the tetraamminecopper (II) sulfate powder, and they are mixed at high speed for 90 mins. The surface modifier is a series of active organosilicon surface modifier such as vinyl trimethoxysilane.

Functionalization of resin powder: sodium dodecyl benzene sulfonate and polyethylene polyamine in a molar ratio of 1:1 are pre-mixed to form a first mixture and then mixed with PP resin powder by a premixing machine to form a functional composite resin powder. The ratio of the first mixture to the resin powder is 1:20.

Preparation of the composite masterbatch with antibacterial and deodorizing functions: The surface-modified tetraamminecopper (II) sulfate powder and the functional composite resin powder are mixed evenly to form a mixture, where the resin powder is PP resin powder; and the tetraamminecopper (II) sulfate powder is in an amount of 25 wt % of the total weight of the mixture. The mixture is compounded by twin-screw extruder under the processing temperature of 180° C. to obtain the composite antibacterial and deodorizing masterbatch.

Example 6

A tetraamminecopper (II) sulfate powder with particle diameter less than 2 μm is prepared by mechanical milling.

Surface modification of the tetraamminecopper (II) sulfate powder: The tetraamminecopper (II) sulfate powder is surface-modified by a high-speed kneader at a temperature of 20° C. and a stirring speed of 500 r/min. The surface modifier is added through measuring device to mix with tetraamminecopper (II) sulfate powder. The surface modifier is in an amount of 3 wt % of the weight of the tetraamminecopper (II) sulfate powder, and they are mixed at high speed for 90 mins. The surface modifier is a series of active organosilicon surface modifier such as vinyl trimethoxysilane.

Functionalization of resin powder: sodium dodecyl benzene sulfonate and polyethylene polyamine in a molar ration of 1:1 are pre-mixed to form a first mixture and then mixed with PP resin powder by a premixing machine to form a functional composite resin powder. The ratio of the first mixture to the resin powder is 1:20.

Preparation of the composite masterbatch with antibacterial and deodorizing functions: The surface-modified tetraamminecopper (II) sulfate powder and the functional composite resin powder are mixed evenly to form a mixture, where the resin powder is PP resin powder; and the tetraamminecopper (II) sulfate powder is in an amount of 25 wt % of the total weight of the mixture. The mixture is compounded by twin-screw extruder under the processing temperature 180° C. to obtain the composite antibacterial and deodorizing masterbatch.

The antibacterial deodorizing masterbatch is dried at a temperature of 100° C. for 8 hours. The dried antibacterial deodorizing masterbatch and the basic resin are mixed evenly to form a mixture, and then the mixture is fed into a feeder of the spinning machine for melt spinning, where the basic resin is PP; the spinning temperature is 195° C.; the spinning speed is 600 m/min; and the initial pressure of the spinning component is 8 Mpa, to obtain the antibacterial and deodorizing fiber. The antibacterial and deodorizing fiber can be in different colors such as yellow, black, etc.

The mechanical properties of the antibacterial and deodorizing fiber obtained in Example 6 are tested and the results are as follows: the tensile strength is 2.46 cn/dtex, the elongation at break is 21%, which satisfies the requirements of various weaving methods. The diameter of single fiber is 1 D (7 μm), and the fiber can be developed into various fabrics such as woven fabric and velvet fabric. When the content of antibacterial and deodorizing fiber in the woven fabric exceeds 25%, the antibacterial property meets the national standard requirements. The antibacterial activity is 98% to *Escherichia coli*, 98% to *Staphylococcus aureus*, and 98% to *Candida albicans*. The deodorization test result is shown in the following table 3:

TABLE 3

| Test items | Test Standards | Test Results | unit |
|---|---|---|---|
| ammonia | Refer to part 21 of SEK standard | 95 | % |
| Acetic acid | provided by Japan textile | 94 | |
| Isovaleric acid | evaluation technology council | 95 | |

Example 7

A tetraamminecopper (II) sulfate powder with particle diameter less than 2 μm is prepared by mechanical milling.

Surface modification of the tetraamminecopper (II) sulfate powder: The tetraamminecopper (II) sulfate powder is surface-modified by a high-speed kneader at a temperature of 20° C. and a stirring speed of 500 r/min. The surface modifier is added through measuring device to mix with tetraamminecopper (II) sulfate powder. The surface modifier is in an amount of 3 wt % of the weight of the tetraamminecopper (II) sulfate powder, and they are mixed at high speed for 90 mins. The surface modifier is a series of active organosilicon surface modifier such as vinyl trimethoxysilane.

Functionalization of resin powder: sodium dodecyl benzene sulfonate and polyethylene polyamine in a molar ratio of 1:1 are pre-mixed to form a first mixture and then mixed with PP resin powder by a premixing machine to form a functional composite resin powder. The ratio of the first mixture to the resin powder is 1:40.

Preparation of the composite masterbatch with antibacterial and deodorizing functions; The surface-modified tetraamminecopper (II) sulfate powder and the functional composite resin powder are mixed evenly to form a mixture, where the resin powder is PP resin powder; and the tetraamminecopper (II) sulfate powder is in an amount of 6 wt % of the total weight of the mixture. The mixture is compounded by twin-screw extruder under the processing temperature 180° C. to obtain the composite antibacterial and deodorizing masterbatch.

The antibacterial deodorizing masterbatch is dried at a temperature of 100° C. for 8 hours. The antibacterial deodorizing masterbatch and the basic resin are mixed evenly to form a mixture, and then the mixture is fed into a feeder of the spinning machine for melt spinning, where the basic resin is PP, the spinning temperature is 195° C.; the spinning speed is 600 m/min; and the initial pressure of the spinning component is 8 Mpa, to obtain the antibacterial and deodorizing fiber. The antibacterial and deodorizing fiber can be in different colors such as yellow, black, etc.

The mechanical properties of the antibacterial and deodorizing fiber obtained in Example 7 are tested and the results are as follows: the tensile strength is 2.46 cn/dtex, the elongation at break is 21%, which meets the requirements of various weaving methods. The diameter of single fiber is 1 D (7 μm), and the fiber can be developed into various fabrics such as woven fabric and velvet fabric. When the content of the antibacterial and deodorizing fiber in the woven fabric exceeds 25%, the antibacterial property meets the national standard requirements. The antibacterial activity is 72% to *Escherichia coli*, 68% to *Staphylococcus aureus*, and 68% to *Candida albicans*. The deodorization test result is shown in the following table 4:

TABLE 4

| Test items | Test Standards | Test Results | unit |
|---|---|---|---|
| ammonia | Refer to part 21 of SEK standard | 65 | % |
| Acetic acid | provided by Japan textile | 64 | |
| Isovaleric acid | evaluation technology council | 65 | |

The present invention utilizes the combination of physical antibacterial method and chemical antibacterial deodorization functions. The physical intervention by the copper particles can destroy the bacterial nucleus, thus making the bacteria inactivated. However, the inactive bacteria would generate unpleasant smell. The conventional method uses the physical adsorption method to solve the problem. However, there is no odor removal function when the adsorption capacity is saturated. In contrast, the present invention uses hydrazide and polyamine compounds to react with the unpleasant smell produced by the inactive bacteria to achieve a high performance of antibacterial and deodorization functions.

It should be noted that the above embodiments are only used to explain the technical scheme of the invention, not the limitation. Although the invention is described in detail with reference to the preferred embodiments, it should be understood by those skilled in the art that the technical scheme of the invention can be modified or replaced equally without departing from the spirit and scope of the technical scheme of the invention which should be covered in the right of the invention.

The invention claimed is:

1. A method for preparing a composite antibacterial and deodorizing masterbatch comprising:

surface modifying copper powder comprising mixing a surface modifier with a copper powder to form a conductive nanopowder under a temperature from 20 to 90° C. and at a stirring speed from 500 to 2000 r/min, wherein the surface modifier is in an amount of 1-5 wt % of the weight of the copper powder, and said mixing time is 30-90 minutes;

functionalizing resin powder comprising mixing organic benzenesulfonates or organic sulfates with hydrazides or polyamines to form a first mixture followed by mixing the first mixture with a resin powder in a molar ratio to form a functional composite resin powder, wherein the molar ratio of organic benzenesulfonates or organic sulfates to hydrazides or polyamines is from 1:9 to 9:1, and the molar ratio of the first mixture to the resin powder is from 1:5 to 1:100;

preparing a composite masterbatch with antibacterial and deodorizing functions comprising mixing the conductive nanopowder with the functional composite resin powder evenly to form a mixture, wherein the surface-modified copper powder is in an amount of 10-50 wt % of the total weight of the mixture, and the mixture is compounded to obtain the composite antibacterial and deodorizing masterbatch.

2. The method for preparing the composite antibacterial and deodorizing masterbatch of claim 1, further comprising preparing the copper powder having particle diameter less than 2 μm before said surface modifying the copper powder.

3. The method for preparing the composite antibacterial and deodorizing masterbatch of claim 1, wherein the copper powder is prepared by mechanical mill or jet mill.

4. The method for preparing the composite antibacterial and deodorizing masterbatch of claim 3, wherein the copper powder is one or more of copper powder, copper oxide powder, cuprous oxide powder, tetraamminecopper (II) sulfate, copper acetate, copper oxalate and/or copper citrate.

5. The method for preparing the composite antibacterial and deodorizing masterbatch of claim 1, wherein the surface modifier is a series of active organosilicon surface modifier comprising vinyl trimethoxysilane or 3-aminopropyltrimethoxysilane.

6. The method for preparing the composite antibacterial and deodorizing masterbatch of claim 1, wherein the resin powder is one or more of PET powder, PBT powder, PTT powder, PC powder, nylon 6 powder, nylon 66 powder, polypropylene powder and/or polyethylene powder.

7. The method for preparing the compound antibacterial and deodorizing masterbatch of claim 6, wherein each of the organic benzenesulfonates and the organic sulfates comprises one or more species; each of the hydrazide and polyamine comprises one or more species; said organic benzenesulfonates comprise sodium dodecyl benzene sulfonate; said organic sulfates comprise sodium dodecyl sulfate; said hydrazide comprises 1-pyrazolyl-2-arylhydrazide compound; and said polyamine comprises ethylenediamine and triethanolamine.

8. The method for preparing the composite antibacterial and deodorizing masterbatch of claim 1, wherein the resin is basic resin slice being one or more of polyester slice, polyolefin slice and/or polyamide slice.

9. A composite antibacterial and deodorizing masterbatch prepared by the method according to claim 1.

* * * * *